United States Patent
Kikuchi et al.

(10) Patent No.: US 6,938,267 B2
(45) Date of Patent: Aug. 30, 2005

(54) OPTICAL DISC AND FABRICATION METHOD THEREOF

(75) Inventors: Minoru Kikuchi, Miyagi (JP); Yoshio Shirai, Miyagi (JP); Mitsuhiro Abe, Miyagi (JP); Toru Abiko, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/399,131

(22) PCT Filed: Jun. 26, 2002

(86) PCT No.: PCT/JP02/06407
§ 371 (c)(1),
(2), (4) Date: Aug. 11, 2003

(87) PCT Pub. No.: WO03/017264

PCT Pub. Date: Feb. 27, 2003

(65) Prior Publication Data

US 2004/0032823 A1 Feb. 19, 2004

(30) Foreign Application Priority Data

Aug. 21, 2001 (JP) .................... P2001-250118

(51) Int. Cl.[7] ............... G11B 7/24; G11B 5/84
(52) U.S. Cl. .................. 720/718; 369/283
(58) Field of Search ............... 720/718, 719; 369/283, 286, 288, 275.1

(56) References Cited

U.S. PATENT DOCUMENTS 6,096,399 A * 8/2000 Yoshinari et al. .......... 428/64.1
6,226,258 B1 * 5/2001 Tominaga et al. .......... 369/283
6,798,732 B2 * 9/2004 Jung et al. ............... 369/275.1

FOREIGN PATENT DOCUMENTS

| JP | 10-302310 | 11/1998 |
| JP | 11-273147 | 10/1999 |
| JP | 2000-298875 | 10/2000 |
| JP | 2001-209971 | 8/2001 |
| JP | 2002-008269 | 1/2002 |
| JP | 2002-074749 | 3/2002 |
| JP | 2002-092956 | 3/2002 |

* cited by examiner

*Primary Examiner*—Allen Cao
(74) *Attorney, Agent, or Firm*—Sonnenschein, Nath & Rosenthal LLP

(57) ABSTRACT

On a replica substrate 1a, a reflection layer 11, a first dielectric layer 12 made of $ZnS-SiO_2$, a recording layer 13 made of a phase change type recording material, and a second dielectric layer 14 made of $ZnS-SiO_2$ are successively formed. In addition, a reaction protection layer 15 made of $Si_3N_4$ or $SiO_2$ is formed on the second dielectric layer 14. As a result, an information signal portion 1c is composed. A light transmissivity sheet is formed through an adhesive layer so that the light transmissivity sheet coats an information signal portion 1c. As a result, a light transmission layer is composed. When the reaction protection layer 15 is not formed, a reaction protection resin layer made of an ultraviolet ray setting resin is formed so that the reaction protection resin layer coats the information signal portion 1c.

17 Claims, 9 Drawing Sheets

OPTICAL DISC AND FABRICATION METHOD THEREOF

TECHNICAL FIELD

The present invention relates to an optical disc and a fabrication method thereof, in particular, to an optical disc of which a light transmission layer formed on a disc substrate is composed of a light transmissivity sheet and an adhesion layer.

BACKGROUND ART

In recent years, in the information recording field, a variety of attempts of research and development have be made for the information recording system. In the optical information recording system, data can be recorded and reproduced contact-freely. As one advantage, the optical information recording system can accomplish a recording density more than ten times higher than the conventional magnetic recording system. As another advantage, the optical information recording system can apply to individual memory types such as the read-only type, the write-once type, the rewritable type, and so forth. Thus, as a system that accomplishes inexpensive and large-capacity files, it has been considered that the optical information recording system will be widely used from industries to homes.

Among those, digital audio discs (DAD) and optical video discs, which are optical discs of read-only memory type, have become common.

In an optical disc such as a digital audio disc, a reflection film that is a metal thin film such as an aluminum (Al) film is formed on an optical disc substrate that is a transparent substrate on which an uneven pattern such as pits and grooves that represent an information signal is formed. In addition, a protection film that protects the reflection film against moisture ($H_2O$) and oxygen ($O_2$) in the atmosphere is formed on the reflection film. When an information signal is reproduced from the optical disc, read light such as laser light is radiated from the optical disc substrate side to the uneven pattern. Corresponding to the difference of reflectance of the incident light and the reflected light of the read light, the information signal is detected.

When such an optical disc is produced, an optical disc substrate having an uneven pattern is formed by the injection molding method. Thereafter, a reflection film made of a metal thin film is formed on the optical disc substrate by the vacuum evaporation method. Thereafter, an ultraviolet ray setting resin is coated on the reflection film. As a result, the protection film has been formed.

In the aforementioned optical information recording system, in recent years, an increase of recording density has been required. To satisfy that, a technology for decreasing the diameter of the spot of the read light with an increased numerical aperture (NA) of an objective lens through which the read light is radiated from an optical pickup has been proposed. According to the technology, while the NA of an objective lens used to reproduce data from a conventional digital audio disc is 0.45, the NA of an objective lens used to reproduce data from an optical video disc such as a DVD (Digital Versatile Disc) that has a recording capacity six to eight times higher than that of the digital audio disc is around 0.60. As a result, the diameter of the spot is decreased.

As the NA of the objective lens is increased, the disc substrate of the optical disc should be thinned so as to transmit the radiated read light. This is because the tolerable amount of the deviation angle (tilt angle) of the optical axis of the optical pickup against the vertical line of the disc surface becomes small. The tilt angle is subject to influences of aberration and double refraction due to the thickness of the substrate. Thus, the substrate is thinned so that the tilt angle becomes as small as possible. For example, the thickness of the substrate of the aforementioned digital audio disc is around 1.2 mm. In contrast, the thickness of the substrate of an optical video disc such as a DVD, which has a recording capacity six to eight times higher than the digital audio disc, is around 0.6 mm.

However, in consideration of the increasing needs of high recording density, the substrate should be further thinned. To satisfy that, another type optical disc has been proposed. In this optical disc, an uneven pattern is formed on one main plane of a substrate as an information signal portion. A reflection film and a light transmission layer, which is a thin film that transmits light, are successively layered. Read light is radiated from the light transmission layer side. As a result, an information signal is reproduced. In such an optical disc, of which read light is radiated from the light transmission layer side and thereby an information signal is reproduced, the film thickness of the light transmission layer is decreased so that the optical disc can conform with a large NA of an objective lens.

However, when the light transmission layer is thinned, it becomes difficult to form a light transmission layer with a thermoplastic resin by the injection molding method, which is used in a conventional optical disc producing method. In other words, in the conventional technology, it is very difficult to form a light transmission layer that has a thickness of around 0.1 mm and that has small double refraction and good transparency.

To solve such a problem, a method for forming a light transmission layer with an ultraviolet ray setting resin. In this method, however, when the light transmission layer is formed with the ultraviolet ray setting resin, it is very difficult to keep the film thickness of the light transmission layer constant on the surface of the substrate. Thus, it is difficult to stably reproduce the information signal.

Alternatively, the light transmission layer may be formed by adhering a thermoplastic resin sheet having a film thickness of 0.1 mm to the surface of the substrate by the roller pressing method. However, in this method, when the sheet is pressed, the sheet deforms and the adhesive agent protrudes to the reading surface side. Thus, it is difficult to form the light transmission layer with an equal film thickness. It is much difficult to stably reproduce the information signal.

Thus, to solve those problems, the inventors of the present invention have thought of a method for forming a light transmission layer of which a sheet composed of an adhesive layer and a light transmission layer is adhered to an information signal portion of a substrate. As a result, a method for adhering a light transmission layer to a substrate using an adhering device composed of an elastic pad and a metal plane stage has been proposed. Next, with reference to an accompanying drawing, the adhering device will be practically described.

In other words, as shown in FIG. 1, in a conventional adhering device, a fixed stage 101 and a movable stage 102 are disposed at their opposite positions.

The fixed stage 101 is used to hold a sheet 103. Thus, the fixed stage 101 is structured so that it can hold the sheet 103. In other words, a vertically movable pin 105 that is protruded from the fixed stage 101 and buried therein is disposed in the fixed stage 101. The vertically movable pin 105 faces the movable stage 102. The diameter of the vertically movable pin 105 is the same as the diameter of a through-hole 103a of the sheet 103. The through-hole 103a of the sheet 103 is fit to the vertically movable pin 105. As a result, the sheet 103 can be held on the fixed stage 101. A substrate alignment pin 106 cylindrically protrudes at an upper portion of the vertically movable pin 105. The diameter of the substrate alignment pin 106 is almost the same as the diameter of a center hole 104a of a disc substrate 104. While the substrate alignment pin 106 aligns the center of the disc substrate 104, the vertically movable pin 105 holds the disc substrate 104. On the fixed stage 101, the sheet 103 is fit to the substrate alignment pin 106 so that the sheet 103 is hold by a shoulder portion of the vertically movable pin 105.

A pad 107 made of an elastic member such as rubber is disposed on an inner plane of the movable stage 102 so that the pad 107 faces the fixed stage 101. The pad 107 is formed in a conical shape. The plane side of the conical shape is secured to the inner plane of the movable stage 102.

When the disc substrate 104 and the sheet 103 are adhered by such an adhering device, the through-hole 103a of the sheet 103 is fit to the vertically movable pin 105 disposed so that the sheet 103 is held on the fixed stage 101. At that point, an adhesive plane 103b of the sheet 103 is disposed so that it faces the movable stage 102. Thereafter, the center hole 104a of the disc substrate 104 is fit to the substrate alignment pin 106 so that the center hole 104a is held on the shoulder portion of the vertically movable pin 105. At that point, the disc substrate 104 is held on the vertically movable pin 105 so that a recording plane 104b that has an information signal portion faces the adhesive plane 103b that has an adhesive layer.

Thereafter, the movable stage 102 is moved toward the fixed stage 101 (downwards in FIG. 1). With the pad 107, the substrate alignment pin 106 is pressed. Thereafter, the vertically movable pin 105 is moved in the fixed stage 101 through the disc substrate 104. As a result, the clearance between the disc substrate 104 and the sheet 103 gradually becomes small. Finally, the disc substrate 104 and the sheet 103 are press-fit. As a result, the recording plane 104b and the adhesive plane 103b are adhered. After they have been stably press-fit, the movable stage 102 is moved in the direction that it is apart from the fixed stage 101. Thereafter, with a predetermined conveying device (not shown), the disc substrate 104 and the sheet 103, which have been press-fit, are removed from the fixed stage 101.

As a result, the disc substrate 104 and the sheet 103 have been adhered. An optical disc of which a light transmission layer has been formed on the recording plane 104b of the disc substrate 104 has been produced.

An optical disc having a light transmission layer formed in such a manner can conform with a large NA of the objective lens, which is used to reproduce data from the optical disc.

However, various experiments and evaluations that the inventors have repeatedly conducted show that such an optical disc has the following problem.

In other words, when a phase change type recording material is used for an information signal portion in an optical disc on which a light transmission layer is formed, as the material of the outermost layer of the information signal portion, a mixture (ZnS—SiO$_2$) of zinc sulfide and silicon oxide, which is a transparent dielectric, are normally used. A light transmissivity sheet is adhered onto the information signal portion having the ZnS—SiO$_2$ layer as the outermost layer through an adhesive layer made of a pressure-sensitive adhesive agent is disposed.

However, the results of which the inventors of the present invention have conducted acceleration tests for a plurality of optical discs having such a light transmission layer and measured reflectance thereof show that the reflectance thereof deteriorates. When the reflectance deteriorates, it will become difficult to record and reproduce an information signal to and from an optical disc having a light transmission layer with high accuracy.

Therefore, an object of the present invention is to provide an optical disc of which a light transmissivity sheet has been adhered on one main plane of a substrate through an adhesive layer, in particular, an optical disc that suppresses the variation of reflectance thereof, that suppresses the variation of reflectance on the recording/reproducing plane thereof, that conforms with a large NA of an objective lens used to record/reproduce data, and that has a light transmission layer that has small double refraction, high transparency, and equal film thickness and an optical disc producing method that allows the production yield to improve.

DISCLOSURE OF THE INVENTION

The inventors of the present invention have intensively made efforts to solve the aforementioned problems of the prior art. The outline will be described in the following.

As described above, according to the knowledge that the inventors of the present invention have obtained, when an optical disc is produced by adhering a light transmissivity sheet and a disc substrate through an adhesive layer made of a pressure-sensitive adhesive agent, the reflectance varies in each of a plurality of optical discs. In addition, the reflectance varies on the recording/reproducing plane. Further observations and experiments that the inventors of the present invention have conducted for those optical discs show that the light transmission layer has yellowish discolored, which causes the reflectance to vary.

The inventors of the present invention have further pursued causes of the yellowish discoloring of the light transmission layer and evaluated them. As a result, the inventors of the present invention have supposed that a chemical reaction of a dielectric layer, which is made of ZnS—SiO$_2$ used for a laminate film that composes the information signal portion of the optical disc, and the pressure sensitive adhesive agent causes the light transmission layer to yellowish discolor. In consideration of the knowledge of the inventors of the present invention along with the supposed cause, it seems that zinc (Zn) mainly affects the pressure-sensitive adhesive agent is high and so does sulfur (S).

In the information signal portion of the optical disc, however, to have sufficient recording characteristic and so, as the material of a dielectric film that sandwiches the recording layer, ZnS—SiO$_2$ is preferably used. When the dielectric film is made of other than ZnS—SiO$_2$ as the material of the dielectric film, which sandwiches the recording layer, there is a possibility that a chemical reaction of the pressure-sensitive adhesive agent and the adhesive layer might cause the adhesive layer to discolor. In addition, the material of the dielectric film is an important structural element in various characteristics such as a recording/reproducing characteristic of the optical disc. Thus, since the material of the dielectric film has many restrictions to improve characteristics, it is very difficult to replace the material of the dielectric film with another one.

The inventors of the present invention have repeatedly evaluated a method for preventing the adhesive layer of the light transmission layer from discoloring, in particular, yellowish discoloring and thought of a method of which a material that does not chemically react with the pressure-sensitive adhesive agent, which composes the adhesive layer, is interposed between the information signal portion and the pressure-sensitive adhesive agent. In addition, the inventors of the present invention have evaluated and experiments various materials that do not chemically react with the pressure-sensitive adhesive agent and has a knowledge that as such a material inorganic materials such as dielectrics for example silicon nitride and silicon oxide and organic materials such as ultraviolet ray setting resin are suitable.

According to the evaluated result that the inventors of the present invention have intensively conducted, to accomplish good reflectance, it is preferred that on the upper layer of the conventional information signal portion of the optical disc, on a lower plane of the adhesive layer of the light transmission layer, a reaction protection layer made of a dielectric inorganic material or an organic material should be disposed. As the material, silicon nitride, silicon oxide, or an ultraviolet ray setting resin is more suitable.

To accomplish the aforementioned object, a first aspect of the present invention is an optical disc having an information signal portion composed of a plurality of layers and configured to record and/or reproduce an information signal and a light transmission layer configured to transmit laser light used to record and/or reproduce the information signal, the information signal portion and the light transmission layer being formed on one main plane of a substrate of the optical disc, wherein the light transmission layer comprises at least a sheet having light transmissivity and an adhesive layer for adhering the sheet to the main plane of the substrate, and wherein a reaction protection layer is formed on the information signal portion so that the reaction protection layer faces the adhesive layer.

According to the first aspect of the present invention, the reaction protection layer is typically made of a dielectric. The dielectric is preferably silicon nitride (SiN, $Si_3N_4$). The film thickness of the reaction protection layer made of silicon nitride is preferably 2 nm or larger. The dielectric that composes the reaction protection layer may be silicon oxide ($SiO_2$). The film thickness of the reaction protection layer made of silicon oxide is preferably 2 nm or larger.

According to the first aspect of the present invention, the film thickness of the light transmission layer is typically in the range from 90 $\mu$m to 110 $\mu$m.

A second aspect of the present invention is an optical disc having an information signal portion composed of a plurality of layers and configured to record and/or reproduce an information signal and a light transmission layer configured to transmit laser light used to record and/or reproduce the information signal, the information signal portion and the light transmission layer being formed on one main plane of a substrate of the optical disc, wherein the light transmission layer comprises a sheet having light transmissivity and an adhesive layer configured to adhere the sheet to the main plane of the substrate, and wherein a reaction protection layer made of an organic material is formed between the information signal portion and the adhesive layer.

According to the second aspect of the present invention, the organic material is typically an ultraviolet ray setting resin. The ultraviolet ray setting resin preferably contains a solvent. The solvent is preferably methoxypropanol. Alternatively, another solvent may be used.

According to the second aspect of the present invention, the distribution of the film thickness of the reaction protection layer in a region of at least the information signal portion is typically 1 $\mu$m or smaller.

According to the second aspect of the present invention, the film thickness of the light transmission layer is typically in the range from 90 $\mu$m to 110 $\mu$m.

According to the second aspect of the present invention, typically, the organic material is an ultraviolet ray setting resin, which is hardened by the radiation of an ultraviolet ray. In reality, the organic material is an ultraviolet ray hardening resin of for example acrylate group, thiol group, epoxy group, or a silicon group. When an ultraviolet ray setting resin is used as the reaction protection layer, typically, an ultraviolet ray is radiated to at least the ultraviolet ray setting resin and then hardened. As a result, the reaction protection layer is formed. According to the present invention, a suitable hardening method can be selected for a resin selected as an organic material.

A third aspect of the present invention is an optical disc having an information signal portion configured to record and/or reproduce an information signal and a light transmission layer configured to transmit laser light used to record and/or reproduce the information signal, the information signal portion and the light transmission layer being formed on one main plane of a substrate of the optical disc, wherein the light transmission layer comprises a sheet having light transmissivity and an adhesive layer configured to adhere the sheet to the main plane of the substrate, wherein the information signal portion comprises a reflection layer configured to reflect the laser light, a first dielectric layer, a recording layer configured to record the information signal, and a second dielectric layer successively formed from the substrate, and wherein the film thickness of the second dielectric layer is designated so that the reflectance of the laser light on a flat plane of the substrate is 15% or larger.

According to the present invention, to allow the reflectance of laser light to be 15% or larger, the film thickness of the second dielectric layer is typically in the range from 45 nm to 90 nm or in the range from 130 nm to 175 nm.

According to the third aspect of the present invention, the second dielectric layer is typically made of a mixture of zinc sulfide and silicon oxide.

A fourth aspect of the present invention is an optical disc producing method, comprising the steps of:

forming an information signal portion configured to record and/or reproduce an information signal on a main plane of a substrate; and adhering a light transmissivity sheet configured to transmit laser light used to record and/or reproduce the information signal in a region that covers the information signal portion through an adhesive layer, wherein a reaction protection layer is formed on the outermost layer of the information signal portion.

According to the fourth aspect of the present invention, the reaction protection layer is typically made of a dielectric. In reality, the dielectric is silicon nitride or silicon nitride. The film thickness of the reaction protection layer made of silicon nitride or silicon oxide is 2 nm or larger.

According to the fourth aspect of the present invention, the adhesive layer is typically made of a pressure-sensitive adhesive agent.

According to the fourth aspect of the present invention, the film thickness of the light transmission layer is preferably in the range from 90 $\mu$m to 110 $\mu$m.

A fifth aspect of the present invention is an optical disc producing method, comprising the steps of:

forming an information signal portion configured to record and/or reproduce an information signal on a main plane of a substrate; and adhering a light transmissivity sheet configured to transmit laser light used to record and/or reproduce the information signal in a region that covers the information signal portion through an adhesive layer, wherein after the information signal portion forming step, before the light transmissivity sheet adhering step, a reaction protection layer made of an organic material is formed on at least an upper layer of the information signal portion.

According to the fifth aspect of the present invention, to coat an organic material such as an ultraviolet ray setting resin on all the plane of at least the information signal portion, it is preferred that after liquid ultraviolet ray setting resin is dripped on the substrate, the substrate is rotated about the center axis of the disc plane. In other words, the ultraviolet ray setting resin is formed so that it coats the information signal portion by for example the spin coat method. When the ultraviolet ray setting resin contains a solvent, after it is coated by the spin coat method, the solvent is evaporated.

According to the fifth aspect of the present invention, the organic material is typically an ultraviolet ray setting resin. To decrease the difference between the inner and outer circumferential film thicknesses of the substrate, the ultraviolet ray setting resin contains a solvent. According to the fifth aspect of the present invention, the distribution of the film thickness of the reaction protection layer in a region for at least the information signal portion is preferably 1 $\mu$m or smaller.

According to the fifth aspect of the present invention, the film thickness of the light transmission layer is typically in the range from 90 $\mu$m to 110 $\mu$m.

According to the present invention, the film thickness of the information signal portion is preferably in the range from 183 nm to 313 nm.

According to the present invention, to suppress the chemical reaction of the adhesive layer and the outermost layer of the information signal layer and prevent the adhesive layer from discoloring, the reaction protection layer is typically made of a dielectric. To securely suppress the discoloring of the adhesive layer, the dielectric is preferably silicon nitride ($Si_3N_{4-x}$ (where 0×1, typically $Si_3N_4$) or silicon oxide ($SiO_x$ (where 1×2, typically $SiO_2$ or SiO). The dielectric may be aluminum nitride ($AlN_x$ (where 0.5×1, typically AlN), aluminum oxide ($Al_2O_{3-x}$ (where 0×1, typically alumina ($Al_2O_3$)), magnesium oxide (MgO), yttrium oxide ($Y_2O_3$), magnesium aluminum oxide ($MgAl_2O_4$), titanium oxide (TiOx (where 1×2, typically $TiO_2$), barium titanium oxide ($BaTiO_3$), strontium titanium oxide ($SrTiO_3$), tantalum oxide ($Ta_2O_{5-x}$ (where 0×1, typically $Ta_2O_5$), germanium oxide ($GeO_x$) (where 1×2), silicon carbide (SiC), zinc sulfide (ZnS), lead sulfide (PbS), Ge—N, Ge—N—O, Si—N—O, calcium fluoride (CaF), lanthanum fluoride (LaF), magnesium fluoride ($MgF_2$), sodium fluoride (NaF), titanium fluoride ($TiF_4$), or the like. Moreover, a material whose principal component is one of those materials or a mixture of these materials for example $AlN-SiO_2$ may be used.

According to the present invention, the substrate typically has a disc shape. In addition, the light transmissivity sheet has a disc shape. According to the present invention, to form a light transmission layer having a light transmissivity sheet, an adhesive layer is disposed on one plane of a sheet that has been cut in a disc shape. By adhering the substrate and the sheet through the adhesive layer, a light transmission layer is formed on the substrate. According to the present invention, typically, the inner diameter of the disc shaped sheet is equal to or larger than the inner diameter of the disc shaped substrate. In addition, the outer diameter of the disc shaped sheet is equal to or smaller than the disc shaped substrate.

According to the present invention, the adhesive layer is typically made of a Pressure-Sensitive Adhesive agent (PSA).

According to the present invention, to minimize the warp and distortion of the optical disc to be produced, the light transmissivity sheet is preferably made of the same material as the substrate. The thickness of the light transmissivity sheet is typically smaller than the thickness of the substrate. In reality, the thickness of the light transmissivity sheet is in the range from 30 $\mu$m to 150 $\mu$m. In addition, according to the present invention, the disc substrate is made of a resin having a low moisture absorbing power such as polycarbonate (PC) or cycloolefin polymer. The light transmissivity sheet is preferably made of the same material as the disc substrate. The substrate may be for example a substrate made of a metal such as aluminum, a glass substrate, or a substrate made of polyolefin, polyimide, polyamide, polyphenylene sulfide, polyethylene terephthalate (PET), or the like. The light transmissivity sheet is typically made of polycarbonate resin. Alternatively, the light transmissivity sheet may be made of another material.

According to the present invention, to prevent a foreign matter present on the sheet holding plane of the adhering device from flawing or denting the light transmissivity sheet, the sheet is preferably composed of a light transmissivity sheet, an adhesive layer formed on one place of the light transmissivity sheet, and a protection layer formed on the other plane of the light transmissivity sheet. In addition, the protection layer is preferably made of a polyethylene terephthalate (PET) sheet, a polyethylene naphthalate (PEN) sheet, or the like. More practically, a second adhesive agent is coated on at least one plane of the PET sheet or the PEN sheet. The plane on which the second adhesive agent has been coated is adhered on one plane of the light transmissivity sheet. As a result, a sheet that is adhered to the disc substrate is obtained.

According to the present invention, the light transmissivity sheet is typically made of a non-magnetic material that can transmit laser light radiated from a GaN semiconductor laser (wavelength of light emission: 400 nm band, blue light emission), a ZnSe semiconductor laser (wavelength of light emission: 500 nm band, green light emission), an AlGaInP semiconductor laser (wavelength of light emission: around 635 to 680 nm, red light emission), or the like, which is used to record/reproduce at least an information signal. In reality, the light transmissivity sheet is made of a thermoplastic resin such as polycarbonate that has a light transmission characteristic.

The present invention can be preferably applied to an optical disc having a thin light transmission layer. In other words, the present invention can be applied to the so-called DVR-red, of which an information signal is recorded and reproduced using a semiconductor laser whose wavelength of light emission is around 650 nm or the so-called DVR-blue, of which an information signal is recorded and reproduced with a semiconductor laser whose wavelength of light emission is around 400 nm. Preferably, using an objective lens whose NA is as high as around 0.85 having two lens elements disposed in series, the DVR records an information signal. Practically, one side of the optical disc has a recording capacity of around 22 GB. The optical disc according to the present invention is an optical disc such as a DVR, which is housed in a cartridge. However, the present invention is not limited to an optical disc that is housed in a cartridge.

In the optical disc and the producing method thereof according to the present invention, a light transmission layer is composed of at least a light transmissivity sheet and an adhesive layer that adheres the light transmissivity sheet to a main plane of a substrate. A layer that composes a plane that contacts the adhesive layer of the information signal portion is composed of a reaction protection layer. As a result, the adhesive layer and a dielectric layer that composes the information signal portion can be prevented from chemically reacting with each other.

BEST MODES FOR CARRYING OUT THE INVENTION

Figure 1:
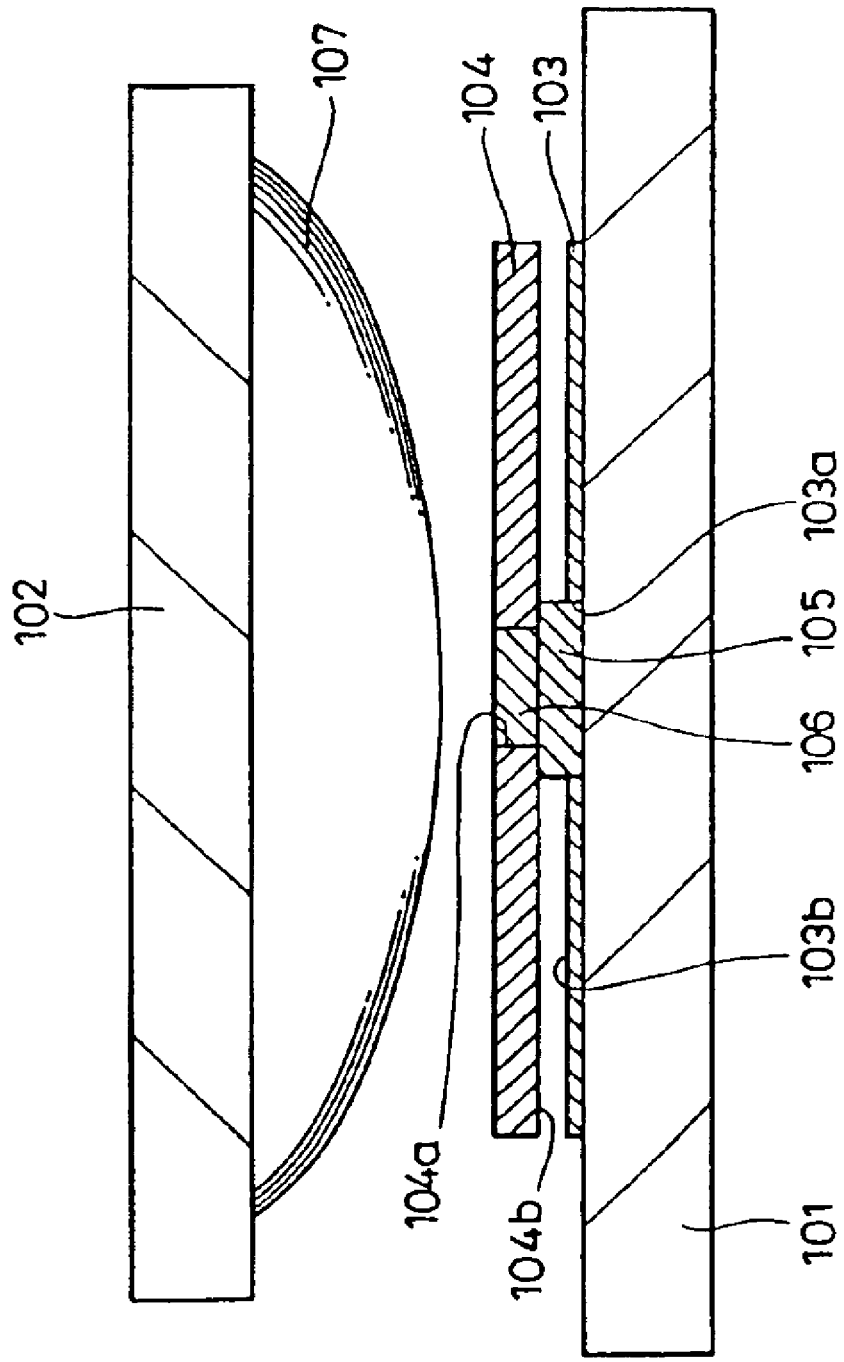
FIG. 1 is a schematic diagram showing a conventional adhering device that is used to adhere a disc substrate and a sheet.

Next, with reference to the accompanying drawings, embodiments of the present invention will be described. In the drawings with which the embodiments will be described, similar portions are denoted by similar reference numerals.

Figure 2:
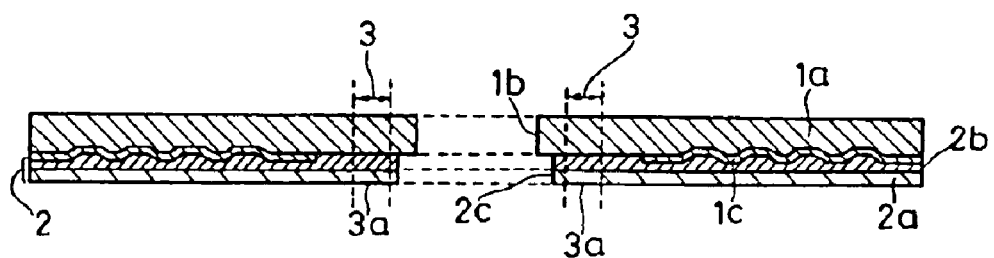
FIG. 2 is a sectional view showing an optical disc according to a first embodiment of the present invention.

First of all, an optical disc according to a first embodiment will be described. FIG. 2 shows the optical disc according to the first embodiment of the present invention.

As shown in FIG. 2, in the optical disc according to the first embodiment, a center hole 1b is formed at a center portion of a replica substrate 1a of a disc substrate 1. One main plane of the disc substrate 1 is unevenly formed. An information signal portion 1c is formed on the main plane of the disc substrate 1. In addition, a light transmission layer 2 is disposed on the disc substrate 1. The light transmission layer 2 is composed of a light transmissivity sheet 2a and an adhesive layer 2b that has been adhered thereto. A through-hole 2c is formed at a center portion of the light transmission layer 2.

A circular clamp region 3 is set around the through-hole 2c on a lower main plane of the light transmissivity sheet 2a of the light transmission layer 2. The innermost diameter of the circular clamp region 3 is for example 23 mm. The outermost diameter of the circular clamp region 3 is for example 33 mm. On the lower main plane of the light transmissivity sheet 2a of the light transmission layer 2 in the circular clamp region 3, a clamp reference plane 3a at which the optical disc is clamped or held by a spindle of a recording and reproducing device (both are not shown) is set. Since the light transmissivity sheet 2a has been adhered to the lower main plane of the disc substrate 1 through the adhesive layer 2b, the diameter of the through-hole 2c is designated equal to or larger than the diameter of the center hole 1b of the disc substrate 1. For example, the diameter of the through-hole 2c is designated 15 mm or larger. In addition, since the clamp reference plane 3a is set on the lower main plane of the light transmissivity sheet 2a of the light transmission layer 2, the diameter of the through-hole 2c is equal to or smaller than the innermost diameter of the circular clamp region 3. In reality, the diameter of the through-hole 2c is for example 23 mm or smaller.

Figure 3:
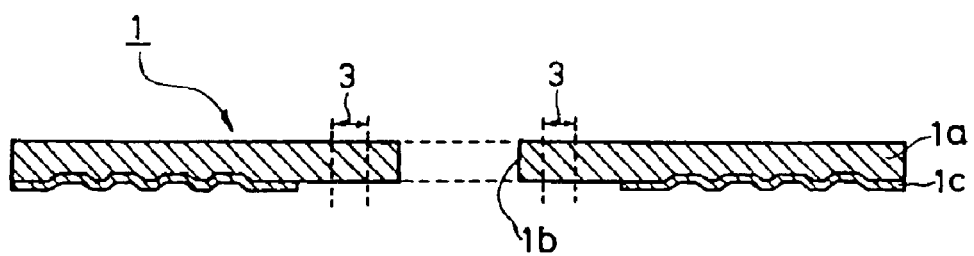
FIG. 3 is a sectional view showing a disc substrate according to the first embodiment of the present invention.
Figure 4:
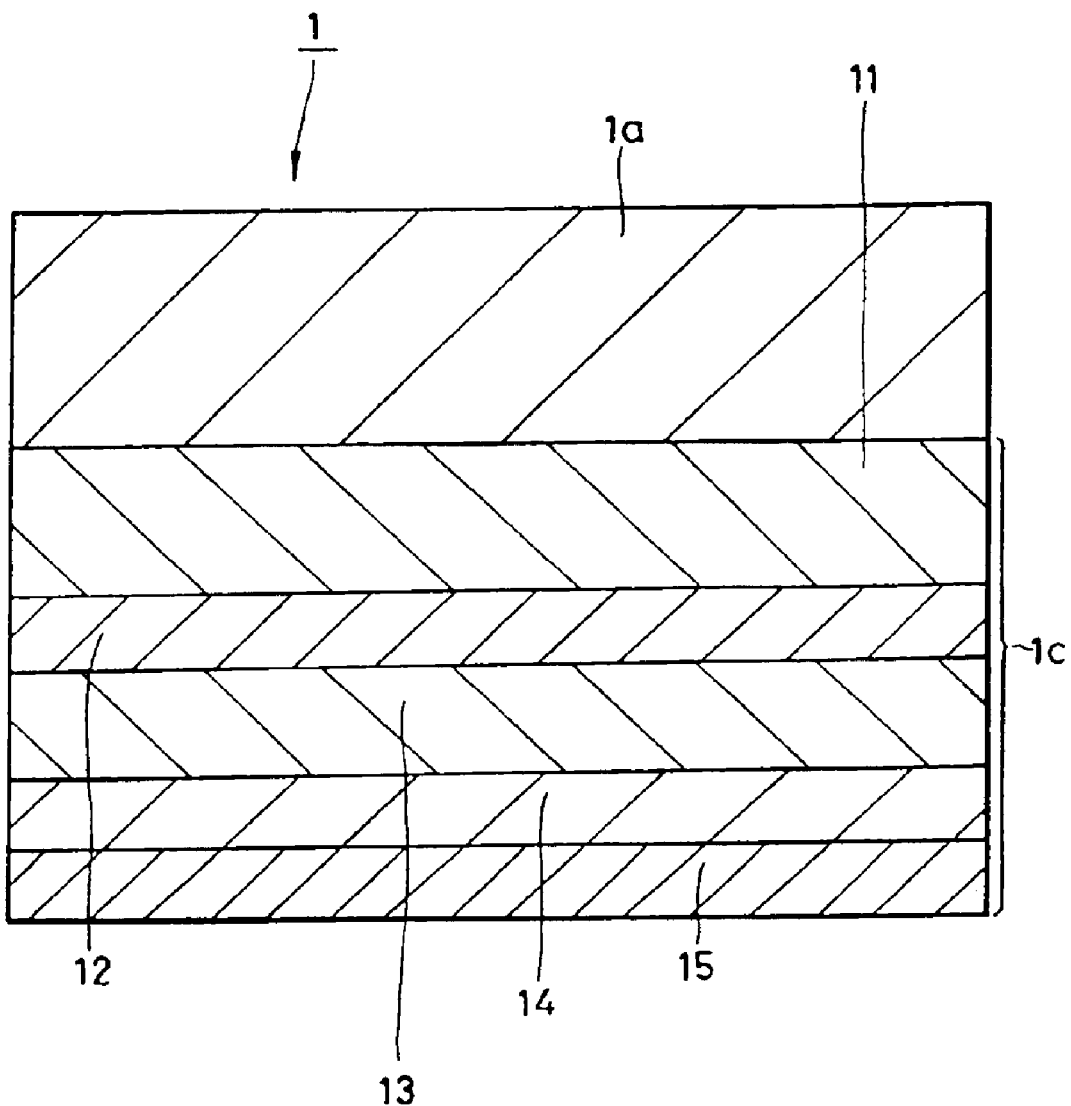
FIG. 4 is a sectional view showing the detail of an information signal portion of the disc substrate according to the first embodiment of the present invention.
Figure 5:
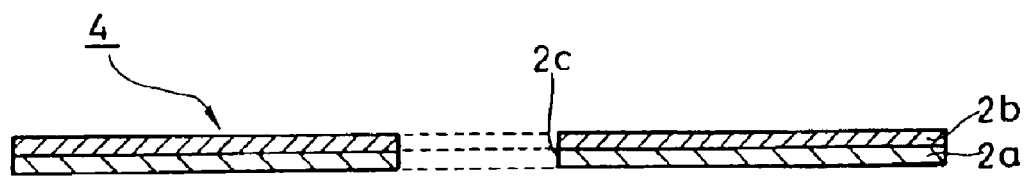
FIG. 5 is a sectional view showing a sheet used to form a light transmission layer according to the first embodiment of the present invention.

Next, a method for producing the optical disc according to the first embodiment will be described. FIG. 3 shows a disc substrate that is a holding member of the optical disc. FIG. 4 shows the detail of the disc substrate. FIG. 5 shows a sheet adhered to the disc substrate.

In the optical disc producing method according to the first embodiment, as shown in FIG. 3, a disc substrate 1 on which a light transmission layer is formed is prepared. In the disc substrate 1, a center hole 1b is formed at a center portion of a replica substrate 1a. An information signal portion 1c is formed on a lower main plane of the disc substrate 1. The lower main plane is unevenly formed.

The replica substrate 1a is produced by the injection molding method using a predetermined stamper. The thickness of the replica substrate 1a is in the range from for example 0.6 to 1.2 mm. As the material of the replica substrate 1a, for example a resin that has a low moisture absorption property such as polycarbonate or cycloolefin polymer (for example, ZEONEX, which is a trademark of Nihon Zeon) is used. The replica substrate 1a may be for example a substrate made of a metal such as aluminum, a glass substrate, or a substrate made of polyolefin, polyimide, polyamide, polyphenylene sulfide, polyethylene terephthalate, or the like. In addition, on the uneven portion formed on the lower main plane of the replica substrate 1a, a recording film, a reflection film, and so forth are formed. Those films compose the information signal portion 1c. The information signal portion 1c is composed of a reflection film, a film made of a magneto-optical material, a film made of a phase change material, or an organic color matter film. Among those, as the material of the reflection film, for example an Al alloy is used. In reality, when the optical disc as the final product is a read-only memory (ROM) optical disc, the information signal portion 1c is composed of a single layer film or a laminate film that has at least a reflection layer made of for example an Al alloy. When the optical disc as the final product is a rewritable optical disc, the information signal portion 1c is composed of a single layer film or a laminate film that has at least a film made of a magneto-optical material or a film made of a phase-change material. When the optical disc as the final product is a write-once type optical disc, the information signal portion 1c is composed of a single layer film or a laminate film that has at least a film made of an organic color matter material.

As shown in FIG. 4, in the disc substrate 1 according to the first embodiment, a polycarbonate (PC) substrate that has a thickness of for example 1.1 mm and that has a disc shape is used as the replica substrate 1a. The diameter (outer diameter) of the replica substrate 1a is for example 120 mm. The aperture (inner diameter) of the center hole 1b is for example 15 mm. On a reflection layer 11, a first dielectric layer 12, a recording layer 13, a second dielectric layer 14, and a reaction protection layer 15 are successively formed. Those layers compose the information signal portion 1c.

As shown in FIG. 5, a sheet 4 as the light transmission layer 2 is composed of a light transmissivity sheet 2a and an adhesive layer 2b made of a pressure-sensitive adhesive agent (PSA) coated on one plane of the light transmissivity sheet 2a. As with the disc substrate 1, the sheet 4 is cut in a disc shape. At a center portion of the sheet 4, a through-hole 2c is formed. The diameter (outer diameter) of the sheet 4 is designated almost the same as or smaller than the outer diameter of the disc substrate 1. In reality, the diameter of the sheet 4 is for example 120 mm. The diameter (inner diameter) of the through-hole 2c is designated equal to or larger than the aperture of the center hole 1b. The innermost diameter of the circular clamp region 3 is designated equal to or smaller than the innermost diameter of the circular clamp region 3 (for example, 23 mm). The diameter of the through-hole 2c is for example 23 mm.

The light transmissivity sheet 2a of the sheet 4 is made of a thermoplastic resin that has light transmissivity that satisfies at least an optical characteristic that can transmit laser light used for recording/reproducing. The material of the thermoplastic resin is close to the material of the replica substrate 1a in heat resistance dimension stability, coefficient of thermal expansion, or coefficient of moisture absorption expansion. In reality, the thermal plastic resin is a methacrylic resin such as polycarbonate (PC) or polymethyl methacrylate. The thickness of the light transmissivity sheet 2a is preferably designated in the range from 50 to 100 $\mu$m, more preferably in the range from 60 to 80 $\mu$m. According to the first embodiment, since the light transmissivity sheet 2a is adhered to one main plane of the disc substrate 1 through the adhesive layer 2b made of a pressure-sensitive adhesive agent (PSA), the thickness of the light transmissivity sheet 2a is designated for example 70 $\mu$m. The thickness of the light transmissivity sheet 2a is designated depending on the wavelength of laser light used for recording/reproducing an information signal and a desired film thickness of the light transmission layer 2.

The PSA, which composes the adhesive layer 2b, is for example acrylic resin. The thickness of the adhesive layer 2b is for example 30 $\mu$m. However, the thickness of the adhesive layer 2b and the material of the pressure-sensitive adhesive agent are designated depending on the desired film thickness of the light transmission layer 2 and the wavelength of the laser light used for recording/reproducing the information signal. While the sheet 4 is stocked, a protection film is laminated on the adhesive layer 2b of the sheet 4.

Next, a method for adhering the disc substrate 1 and the sheet 4 will be described.

Figure 6:
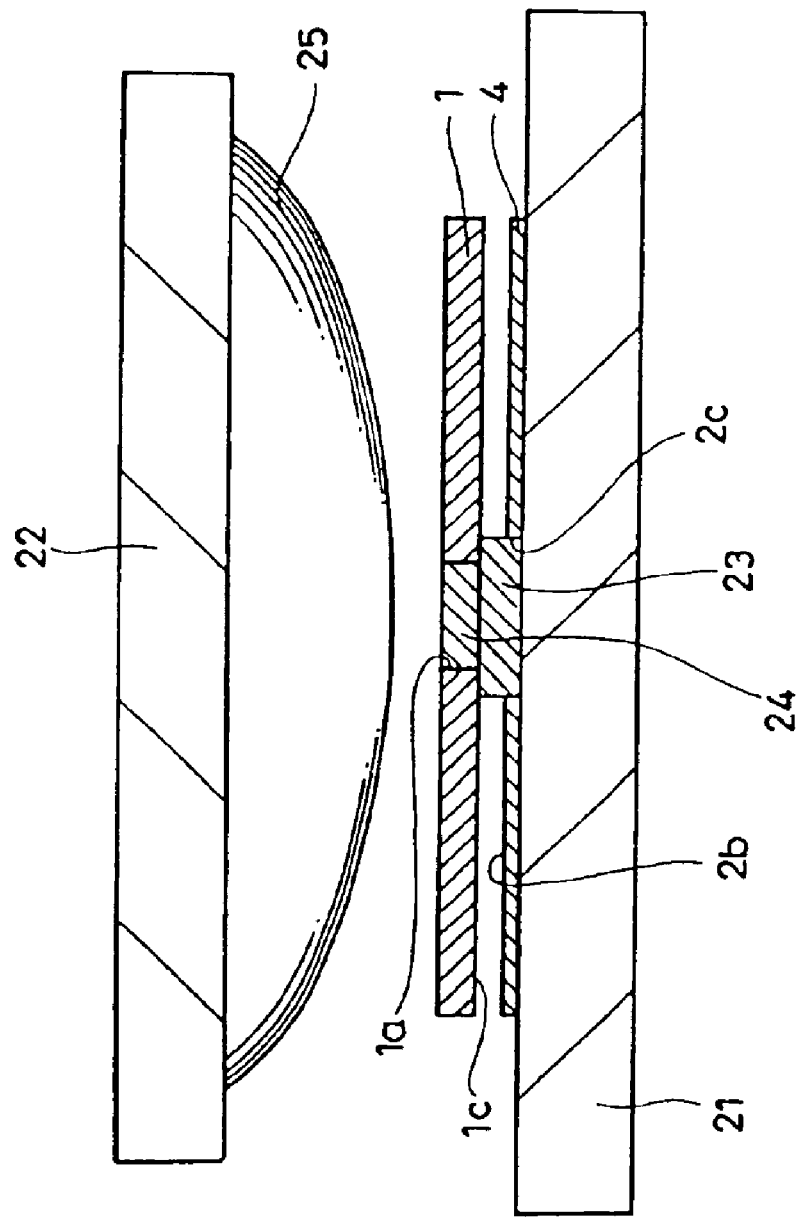
FIG. 6 is a schematic diagram showing an adhering device that adheres the disc substrate and the sheet according to the first embodiment of the present invention.

First of all, an adhering device used to adhere the disc substrate 1 and the sheet 4 will be described. FIG. 6 shows the adhering device according to the first embodiment.

As shown in FIG. 6, in the adhering device according to the first embodiment, a fixed stage 21 and a movable stage 22 are disposed at their opposite positions.

The fixed stage 21 is structured so that it can hold a sheet 4. In other words, in the fixed stage 21, a vertically movable pin 23 that is protruded from the fixed stage 21 and buried therein is disposed at a portion that faces the movable stage 22. The diameter of the vertically movable pin 23 is the same as the diameter of the through-hole 2c of the sheet 4. The through-hole 2c of the sheet 4 is fit to the vertically movable pin 23. The sheet 4 is held on the fixed stage 21. A substrate alignment pin 24 that protrudes in a cylinder shape is disposed at an upper portion of the vertically movable pin 23. The diameter of the substrate alignment pin 24 is almost the same as the diameter of the center hole 1b of the disc substrate 1. While the substrate alignment pin 24 is aligned with the center of the disc substrate 1, the disc substrate 1 is held with the vertically movable pin 23. On the fixed stage, the sheet 4 is fit to the vertically movable pin 23 so that the sheet 4 is held. While the disc substrate 1 is fit to the substrate alignment pin 24, the disc substrate 1 is held by a shoulder portion of the vertically movable pin 23.

On a lower plane of the movable stage 22, a pad 25 made of an elastic member for example rubber is disposed so that the pad 25 faces the fixed stage 21. The pad 25 has a circular cone shape. The plane side of the circular cone shape of the pad 25 is secured to the lower plane of the movable stage 22.

When the disc substrate 1 and the sheet 4 are adhered by the adhering device according to the first embodiment, the through-hole 2c of the sheet 4 is fit to the vertically movable pin 23 so that the sheet 4 is held on the fixed stage 21. At that point, the sheet 4 is placed so that the adhesive layer 2b faces the movable stage 22. Thereafter, the center hole 1b of the disc substrate 1 is fit to the substrate alignment pin 24 so that the disc substrate 1 is held on the shoulder portion of the vertically movable pin 23. At that point, the disc substrate 1 is held by the vertically movable pin 23 so that the information signal portion 1c that has the information signal portion faces the adhering plane of the adhesive layer 2b.

Thereafter, the movable stage 22 is moved toward the fixed stage 21 (downwards in FIG. 6). With the pad 25, the substrate alignment pin 24 is pressed. Thereafter, the vertically movable pin 23 is moved in the fixed stage 21. As a result, the clearance between the disc substrate 1 and the sheet 4 is gradually decreased. Finally, the disc substrate 1 and the sheet 4 are press-fit. As a result, the plane of the information signal portion 1c and the adhesive layer 2b are adhered. After they have been stably press-fit, the movable stage 22 is moved so that it is apart from the fixed stage 21. Thereafter, with a predetermined conveying device (not shown), the disc substrate 1 and the sheet 4 which have been press-fit are removed from the fixed stage 21.

As a result, the disc substrate 1 and the sheet 4 has been adhered. An optical disc of which the light transmission layer 2 has been formed on the plane of the information signal portion 1c of the disc substrate 1 has been produced.

The inventors of the present invention have produced various types of disc substrates 1 in which the film thickness of the reaction protection layer 15 had been varied and have compared them. In reality, as the replica substrate 1a, a polycarbonate (PC) substrate that has a thickness of 1.1 mm and has a disc shape is used. As the information signal portion 1c, a laminate film of a reflection layer 11 made of an Al alloy that has a film thickness of 100 nm, a first dielectric layer 12 that has a film thickness of 18 nm and that is made of a mixture of ZnS and $SiO_2$ (ZnS—$SiO_2$), a recording layer 13 that has a film thickness of 24 nm and that is made of a GeInSbTe alloy layer, a second dielectric layer 14 that is made of ZnS—SiO$_2$, and a reaction protection layer 15 that is made of a dielectric is used.

The film thickness of the second dielectric layer 14, made of ZnS—SiO$_2$, of the information signal portion 1c is designated so that the reflectance of the mirror portion becomes 15% or larger. In other words, in grooves used to record/reproduce an information signal on the optical disc, the reflectance of 10% or larger is required. The reflectance of the grooves is around 70% of the reflectance of the flat mirror portion. Thus, to obtain good recording/reproducing characteristics on the grooves, the reflectance of the mirror portion should be 15% or larger. In such a consideration, the inventors of the present invention have measured the film thickness dependency of the second dielectric layer (ZnS—SiO$_2$) to the reflectance.

Figure 7:
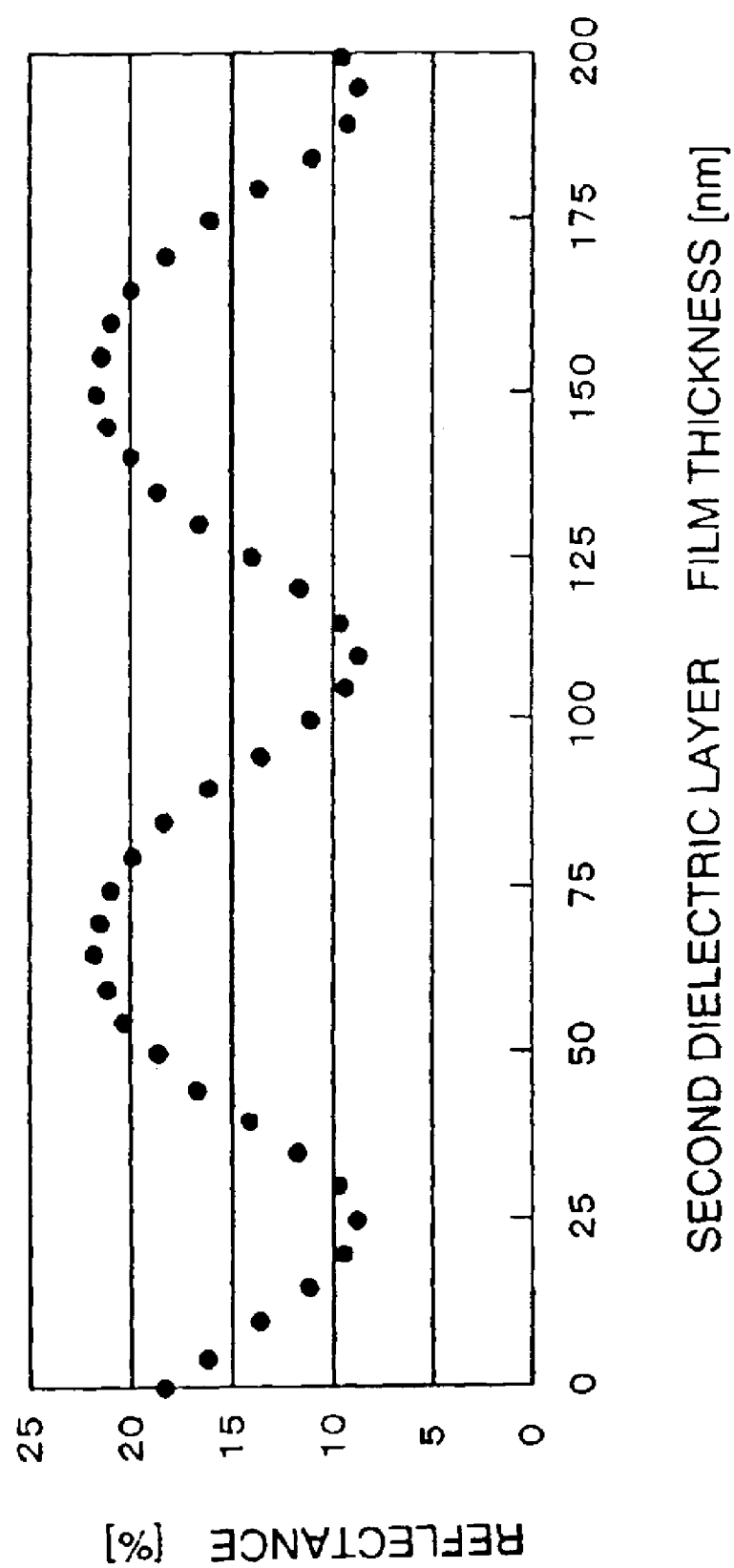
FIG. 7 is a graph showing a film thickness dependency of a second dielectric layer to the reflectance of a mirror portion of the optical disc according to the first embodiment of the present invention.

FIG. 7 shows the measured results. As shown in FIG. 7, the inventors of the present invention have thought of the fact that as the film thickness of the second dielectric layer 14 increases, the reflectance varies in a sine wave shape. Thus, the film thickness of the second dielectric layer 14 is designated so that the reflectance, which varies in a sine wave shape, becomes 15% or larger. In reality, the film thickness of the second dielectric layer 14 is designated in the range from 45 to 90 nm or in the range from 130 to 175 nm. According to the first embodiment, the film thickness of the second dielectric layer 14 is designated 140 nm.

The material of the reaction protection layer 15 of the information signal portion 1c is decided in the following manner. In other words, as described above, the light transmissivity sheet 2a is adhered on the information signal portion 1c through the adhesive layer 2b made of a pressure-sensitive adhesive agent (PSA). Thus, as the material of the reaction protection layer 15, which composes the outermost layer of the information signal portion 1c, a material that does not chemically react with the adhesive layer 2b is selected. In reality, for example, silicon nitride is selected. According to the first embodiment, the reaction protection layer 15 is made of Si$_3$N$_4$.

A disc substrate 1 according to the first embodiment is a disc substrate of which the outermost layer of the information signal portion 1c is the reaction protection layer 15 made of Si$_3$N$_4$. A disc substrate 1 of which the film thickness of the reaction protection layer 15 is 1 nm is referred to as disc substrate 1 of Example 1. A disc substrate 1 of which the film thickness of the reaction protection layer 15 is 2 nm is referred to as disc substrate 1 of Example 2. A disc substrate 1 of which the film thickness of the reaction protection layer 15 is 5 nm is referred to as disc substrate 1 of Example 3. A disc substrate 1 of which the film thickness of the reaction protection layer 15 is 10 nm is referred to as disc substrate 1 of Example 4. A disc substrate 1 of which the film thickness of the reaction protection layer 15 is 30 nm is referred to as disc substrate 1 of Example 5.

A disc substrate 1 of which a disc shaped PC substrate that has a thickness of 1.1 mm is used as the replica substrate 1a, the diameter (outer diameter) of the PC substrate is for example 120 mm, and the aperture (inner diameter) of the center hole 1b is for example 15 mm is referred to as disc substrate 1 of Comparative Example. The information signal portion 1c of the conventional disc substrate 1 is composed of a laminate of a reflection layer made of an Al alloy having a film thickness of 100 nm, a first dielectric layer made of ZnS—SiO$_2$ having a film thickness of 18 nm, a phase change recording layer made of a GeInSbTe alloy having a film thickness of 24 nm, and a second dielectric layer made of ZnS—SiO$_2$ having a film thickness of 140 nm. In other words, the disc substrate that does not have a reaction protection layer 15 is referred to as disc substrate 1 of Comparative Example.

The rates of variation of reflectance of the optical discs produced by the adhering method using the disc substrates 1 of Example 1 to Example 5 and Comparative Example have been measured. First of all, the initial crystallizing process has performed for the optical disc produced with the disc substrates of Example 1 to Example 5 and Comparative Example. As a result, the recording layer 13 of the information signal portion 1c has been changed from the amorphous state to the crystal state. Thereafter, the initial reflectance has been measured. The optical discs have been placed in a constant-temperature, constant-humidity tank in which temperature has been kept at 80° C. and the humidity has been kept at 85% for 1000 hours. In those conditions, acceleration tests have been performed. Thereafter, the reflectance of the optical discs taken from the constant-temperature, constant-humidity tank has been measured. Thereafter, the variation of reflectance before and after the acceleration tests has been measured. The reflectance has been measured for a non-uneven portion of the optical discs namely mirror portion thereof using an evaluating system for an optical system having a wavelength of 400 nm and a numerical aperture NA of 0.85. The rate of variation of reflectance has been obtained by dividing the amount of variation of reflectance of which the reflectance after the acceleration tests is subtracted from the initial reflectance by the initial reflectance. Table 1 shows the measured results of the rates of variation of reflectance.

TABLE 1

|  | Comparative example | Example 1 | Example 2 | Example 3 | Example 4 | Example 5 |
| --- | --- | --- | --- | --- | --- | --- |
| Film thickness of Si$_3$N$_4$ [nm] | 0 | 1 | 2 | 5 | 10 | 30 |
| Initial reflectance [%] | 20.0 | 20.1 | 20.7 | 21.2 | 21.6 | 18.0 |
| Reflectance after acceleration test [%] | 14.3 | 17.2 | 18.8 | 19.9 | 20.8 | 17.8 |
| Amount of variation of reflectance [%] | 5.7 | 2.9 | 1.9 | 1.3 | 0.8 | 0.2 |
| Amount of variation of reflectance/ Initail reflectance | 0.285 | 0.144 | 0.092 | 0.061 | 0.037 | 0.011 |

Table 1 shows that the amounts of variation of reflectance (rates of variation of reflectance) to the initial reflectance of the acceleration tests for the optical discs produced with the disc substrates 1 of Example 1 to Example 5 (namely, optical discs of Example 1 to Example 5) are in the range from 0.011 to 0.144 and that the rate of variation of reflectance to the initial reflectance of the acceleration test for the optical disc produced with the disc substrate 1 of Comparative Example (namely, optical disc of Comparative Example) is 0.285, which is around twice as large as that of Example 1. In addition, yellowish discoloring has been observed in the adhesive layer 2b of the optical disc of Comparative Example. The knowledge that the inventors of the present invention have obtained through the experiments represents that the yellowish discoloring of the adhesive layer 2b is a cause of the decrease of the reflectance. Thus, with the reaction protection layer 15 disposed at the interface with the adhesive layer 2b of the information signal portion 1c, the reflectance can be prevented from deteriorating.

Table 1 also shows that in the optical discs of Example 1 to Example 5, since the rate of variation of reflectance of the optical disc of Example 1, where the film thickness of the reaction protection layer 15 made of $Si_3N_4$ is 1 nm, is 0.144 and the rate of variation of reflectance of the optical disc of example 2, where the film thickness of the reaction protection layer 15 is 2 nm, is 0.092, it is clear that the rate of variation of reflectance of the optical disc of Example 2 decreases against that of the optical disc of Example 1. In other words, it is clear that the deterioration of the reflectance of the optical disc of Example 2 is suppressed against the optical disc of Example 1. When other examples are compared in the same manner, it is clear that as the film thickness of the reaction protection layer 15 is increased, the rate of variation of reflectance is decreased as with the optical disc of Example 3 to the optical disc of Example 2; the optical disc of Example 4 to the optical disc of Example 3; and the optical disc of Example 5 to the optical disc of Example 4. In addition, the results that the inventors of the present invention have observed the optical discs of Example 1 to Example 5 represent that with the reaction protection layer 15, the yellowing discoloring is decreased.

When the rate of variation of reflectance exceeds 0.1, the recording/reproducing characteristics of an information signal tend to deteriorate. Thus, the film thickness of the reaction protection layer 15 made of $Si_3N_4$ should be larger than 1 nm, preferably 2 nm or larger. When the film thickness of the reaction protection layer 15 is 2 nm or larger, it is certain that the rate of variation of reflectance is 0.1 or smaller. As a result, good recording/reproducing characteristics are acquired.

As described above, in the optical disc and the producing method thereof according to the first embodiment, since the reaction protection layer 15 made of $Si_3N_4$, which does not chemically react with the adhesive layer 2b, is disposed as the outermost layer of the information signal portion 1c on the lower main plane of the disc substrate 1, when the optical disc is used for a long time, the adhesive layer 2b can be prevented from yellowish discoloring at the interface with the information signal portion 1c. As a result, the decrease of the reflectance and the deterioration of the optical disc due to the discoloring can be suppressed. Since the optical disc according to the first embodiment of the present invention has the light transmission layer, which is thin and which has small double refraction, high transparency, and equal thickness, the optical disc conforms with a large NA of an objective lens and has good recording/reproducing characteristics.

Next, an optical disc according to a second embodiment of the present invention will be described. Unlike with the optical disc according to the first embodiment, in the optical disc according to the second embodiment, the reaction protection layer 15 is made of silicon oxide ($SiO_2$).

The material of the reaction protection layer 15 is decided in the following manner. As described above, a light transmissivity sheet 2a is adhered to the outermost layer of an information signal portion 1c through an adhesive layer 2b made of a pressure-sensitive adhesive agent (PSA). Thus, as the material of the reaction protection layer 15, which composes the outermost layer of the information signal portion 1c, a material that does not chemically react with the adhesive layer 2b, practically, for example silicon oxide, is selected. According to the second embodiment, the reaction protection layer 15 is made of $SiO_2$.

A disc substrate 1 according to the second embodiment, where the outermost layer of the information signal portion 1c is the reaction protection layer 15 made of $SiO_2$, is hereinafter referred to as disc substrate 1 of each of examples. A disc substrate 1 of which the film thickness of the reaction protection layer 15 is 1 nm is referred to as disc substrate 1 of Example 6. A disc substrate 1 of which the film thickness of the reaction protection layer 15 is 2 nm is referred to as disc substrate 1 of Example 7. A disc substrate 1 of which the film thickness of the reaction protection layer 15 is 5 nm is referred to as disc substrate 1 of Example 8. A disc substrate 1 of which the film thickness of the reaction protection layer 15 is 10 nm is referred to as disc substrate 1 of Example 9. A disc substrate 1 of which the film thickness of the reaction protection layer 15 is 30 nm is referred to as disc substrate 1 of Example 10. A disc substrate 1 used to compare those disc substrates 1 is the same as that according to the first embodiment. This disc substrate 1 is referred to as disc substrate 1 of Comparative Example.

Since the other structure of the optical discs according to the second embodiment is the same as that according to the first embodiment, the description will be omitted. In addition, since the optical disc producing method according to the second embodiment is the same as that according to the first embodiment, the description will be omitted.

The rates of variation of reflectance of optical discs having the light transmission layer formed by the adhering method according to the first embodiment with the disc substrates 1 of Example 6 to Example 10 and Comparative Example have been measured.

In other words, the initial crystallizing process has been performed for the optical discs produced with the disc substrates 1 of Example 6 to Example 10 and Comparative Example. As a result, the recording layer 13 of the information signal portion 1c has been changed from the amorphous state to the crystal state. Thereafter, the initial reflectance has been measured. The optical discs have been placed in a constant-temperature, constant-humidity tank in which the temperature has been kept at 80° C. and the humidity has been kept at 85% for 1000 hours. In those conditions, acceleration tests have been performed. Thereafter, the reflectance of the optical discs taken from the constant-temperature, constant-humidity tank has been measured. Thereafter, the variation of reflectance before and after the acceleration tests has been measured. The reflectance has been performed at a non-uneven portion namely mirror portion thereof using an evaluating device for an optical system having a wavelength of 400 nm and a numerical aperture NA of 0.85. Table 2 shows the measured results of the rates of variations of reflectance.

TABLE 2

|  | Comparative example | Example 6 | Example 7 | Example 8 | Example 9 | Example 10 |
|---|---|---|---|---|---|---|
| Film thickness of $SiO_2$ [nm] | 0 | 1 | 2 | 5 | 10 | 30 |
| Initial reflectance [%] | 20.0 | 20.1 | 20.6 | 21.1 | 21.3 | 18.4 |
| Reflectance after acceleration test [%] | 14.3 | 17.1 | 18.8 | 19.7 | 20.6 | 17.9 |
| Amount of variation of reflectance [%] | 5.7 | 3.0 | 1.8 | 1.4 | 0.7 | 0.5 |
| Amount of variation of reflectance/ Initail reflectance | 0.285 | 0.149 | 0.087 | 0.066 | 0.033 | 0.027 |

Table 2 shows that the amounts of variation of reflectance (rates of variation of reflectance) to the initial reflectance of the acceleration tests for the optical discs produced with the disc substrates 1 of Example 6 to Example 10 (namely, optical discs of Example 6 to Example 10) are in the range from 0.027 to 0.149 and that the rate of variation of reflectance to the initial reflectance of the acceleration test for the optical disc produced with the disc substrate 1 of Comparative Example (namely, optical disc of Comparative Example) is 0.285, which is around twice as large as that of Example 6. In addition, as described in the first embodiment, yellowish discoloring has been observed in the adhesive layer 2b of the optical disc of Comparative Example. The yellowish discoloring of the adhesive layer 2b is a cause of the decrease of the reflectance. Thus, when the reaction protection layer 15, which is made of $SiO_2$ and which does not chemically react with the adhesive layer 2b, is disposed at the interface with the adhesive layer 2b of the information signal portion 1c, the reflectance can be prevented from deteriorating.

Table 2 also shows that in the optical discs of Example 6 to Example 10, since the rate of variation of reflectance of the optical disc of Example 6, where the film thickness of the reaction protection layer 15 made of $SiO_2$ is 1 nm, is 0.149 and the rate of variation of reflectance of the optical disc of Example 7, where the film thickness of the reaction protection layer 15 is 2 nm, is 0.087, it is clear that the rate of variation of reflectance of the optical disc of Example 7 decreases against that of the optical disc of Example 6. In other words, it is clear that the deterioration of the reflectance of the optical disc of Example 7 is suppressed against the optical disc of Example 6. When other examples are compared in the same manner, it is clear that as the film thickness of the reaction protection layer 15 is increased, the rate of variation of reflectance is decreased as with the optical disc of Example 8 to the optical disc of Example 7; the optical disc of Example 9 to the optical disc of Example 8; and the optical disc of Example 10 to the optical disc of Example 9. In addition, the results that the inventors of the present invention have observed the optical discs of Example 6 to Example 10 represent that with the reaction protection layer 15, the yellowing discoloring is decreased.

When the rate of variation of reflectance exceeds 0.1, the recording/reproducing characteristics of an information signal tend to deteriorate. Thus, the film thickness of the reaction protection layer 15 made of $SiO_2$ should be larger than 1 nm, preferably 2 nm or larger. When the film thickness of the reaction protection layer 15 is 2 nm or larger, it is certain that the rate of variation of reflectance is 0.1 or smaller. As a result, good recording/reproducing characteristics are acquired.

In the optical disc and the producing method thereof according to the second embodiment, since the reaction protection layer 15 made of $SiO_2$, which does not chemically react with the adhesive layer 2b, is disposed as the outermost layer of the information signal portion 1c on the lower main plane of the disc substrate 1, the same effect as the first embodiment can be obtained.

Figure 8:
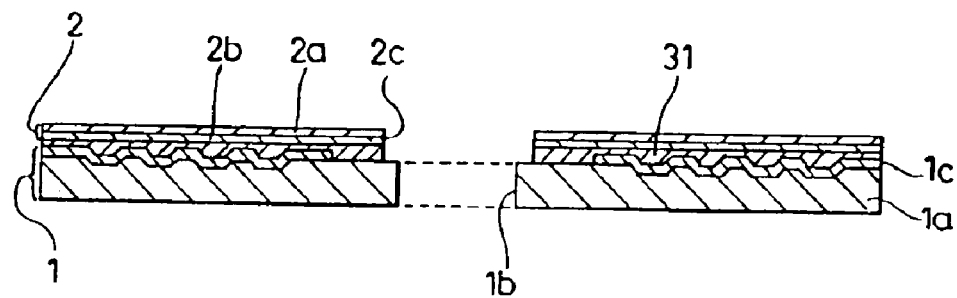
FIG. 8 is a sectional view showing an optical disc according to a third embodiment of the present invention.

Next, an optical disc according to a third embodiment of the present invention will be described. FIG. 8 shows the optical disc according to the third embodiment of the present invention.

As shown in FIG. 8, unlike with the first embodiment, in the optical disc according to the third embodiment, a reaction protection resin layer 31 made of ultraviolet ray setting resin is formed so that it coats an information signal portion 1c. A light transmissivity sheet 2a is adhered to the front surface of the reaction protection resin layer 31 through an adhesive layer 2b. In such a manner, an optical disc is structured.

Figure 9:
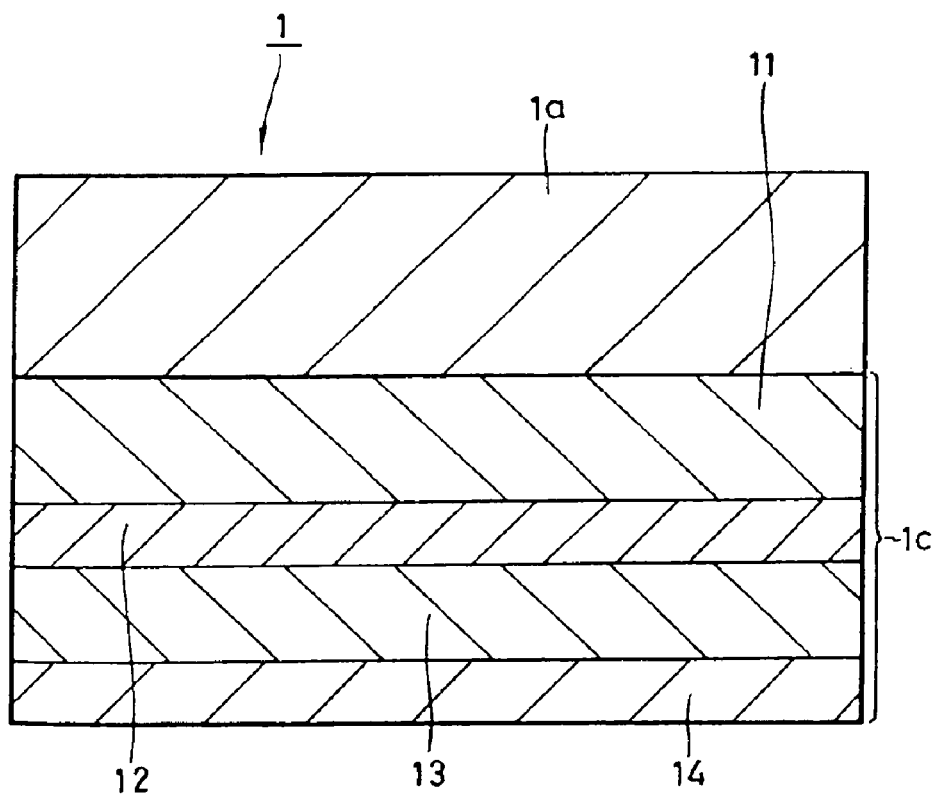
FIG. 9 is a sectional view showing a disc substrate according to the third embodiment of the present invention.

As shown in FIG. 9, unlike with the information signal portions 1c according to the first and second embodiments, the information signal portion 1c according to the third embodiment does not have a reaction protection layer 15. In the disc substrate 1 according to the third embodiment, a reaction protection resin layer 31 is formed on all one main plane of a disc substrate 1. A disc substrate 1 that does not have the reaction protection resin layer 31 is referred to as disc substrate 1 of Comparative Example as with the first embodiment.

Next, an optical disc producing method according to the third embodiment will be described. On an uneven portion formed on one main plane of a replica substrate 1a that is the same as that according to the first embodiment, a recording film, a reflection film, and so forth have been formed. These films compose the information signal portion 1c.

As shown in FIG. 9, in the disc substrate 1 according to the third embodiment, as the replica substrate 1a, a polycarbonate (PC) substrate that has a thickness of 1.1 mm and that has a disc shape is used. The diameter (outer diameter) of the PC substrate is for example 120 mm. The aperture (inner diameter) of a center hole 1b is for example 15 mm. The information signal portion 1c is a laminate film of a reflection layer 11 made of an Al allow having a film thickness of 100 nm, a first dielectric layer 12 that has a film thickness of 18 nm and that is a mixture of ZnS and $SiO_2$, a phase change recording layer 13 that has a film thickness of 24 nm and that is made of a GeSbTe alloy layer, and a second dielectric layer 14 made of a mixture ($ZnS$—$SiO_2$) of zinc sulfide (ZnS) and silicon oxide ($SiO_2$) that are successively layered. As with the first embodiment, the film thickness of the second dielectric layer 14 made of ZnS—$SiO_2$ is designated so that the reflectance of a mirror portion becomes 15% or larger. In reality, the film thickness of the second dielectric layer 14 is designated in the range from 45 to 90 nm or in the range from 130 to 175 nm. According to the third embodiment, the film thickness of the second dielectric layer 14 is designated 140 nm.

Since the sheet 4 is the same as those according to the first and second embodiments, the description thereof will be omitted.

Figure 10:
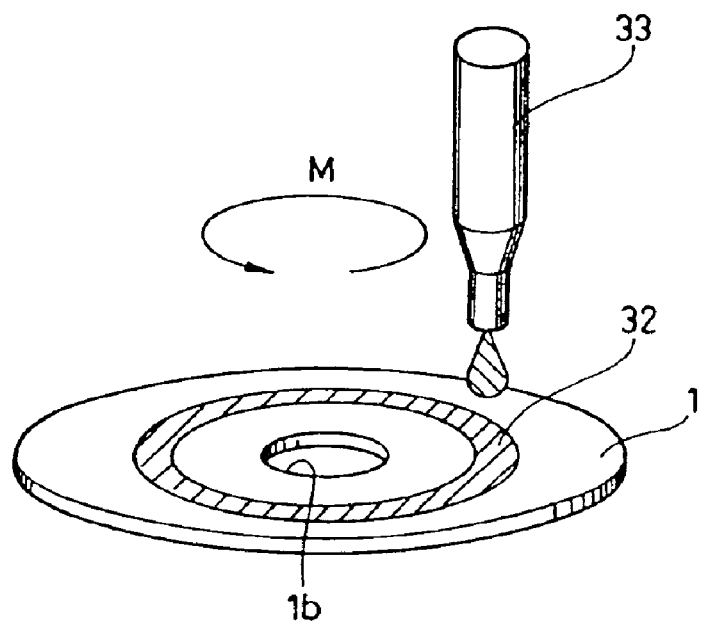
FIG. 10 is a schematic diagram for explaining a method for forming a reaction protection resin layer according to the third embodiment of the present invention.
Figure 11:
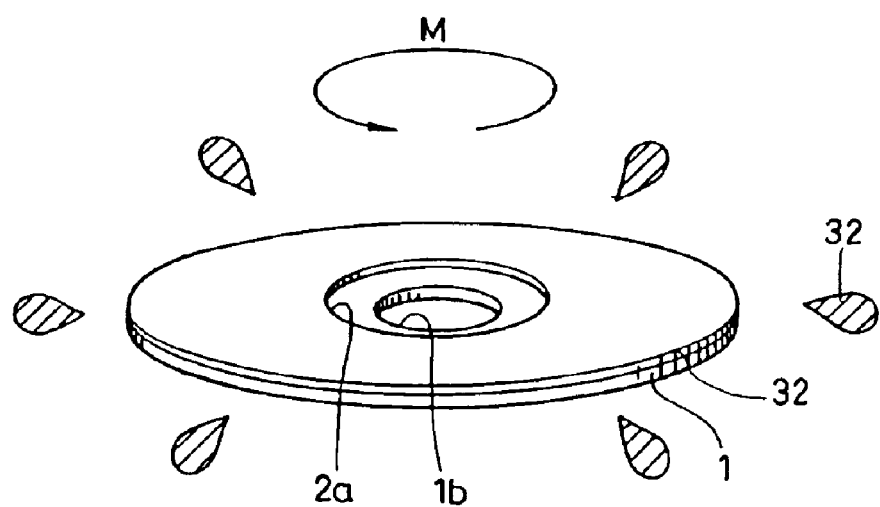
FIG. 11 is a schematic diagram for explaining the method for forming the reaction protection resin layer according to the third embodiment of the present invention.
Figure 12:
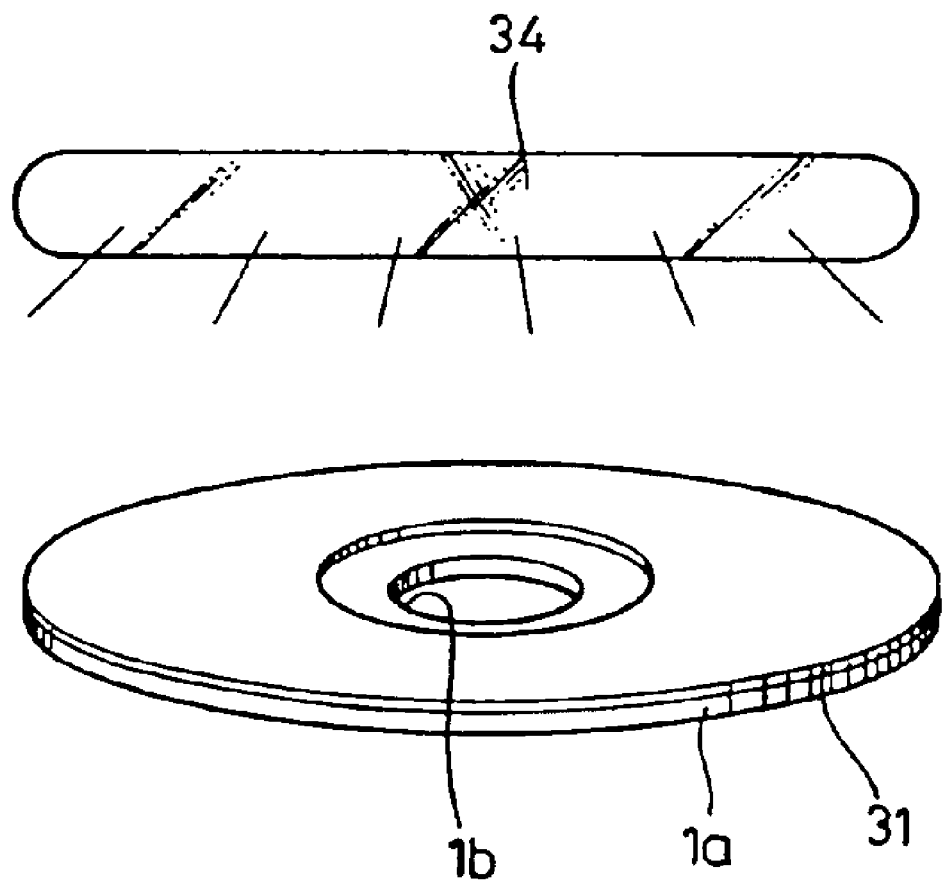
FIG. 12 is a schematic diagram for explaining the method for forming the reaction protection resin layer according to the third embodiment of the present invention.

Next, a method for forming the reaction protection resin layer 31 according to the third embodiment will be described. FIG. 10 to FIG. 12 show the method for forming the reaction protection resin layer 31 according to the third embodiment.

As shown in FIG. 10, ultraviolet ray setting resin 32 is supplied to and coated on one main plane of the information signal portion 1c of the disc substrate 1. The ultraviolet ray setting resin 32 is supplied from a nozzle opening of an ultraviolet ray setting resin supplying portion 33 to the inner circumferential side of the disc substrate 1 so that the ultraviolet ray setting resin 32 is formed in for example a disc shape.

Next, as shown in FIG. 11, the disc substrate 1 on which the ultraviolet ray setting resin 32 has been coated is rotated counterclockwise (in the arrow direction M shown in FIG. 11) about a rotating shaft (not shown) of the device. As a result, the ultraviolet ray setting resin 32 is fully coated on the front surface of the disc substrate 1. Since the disc substrate 1 is rotated counterclockwise, excessive ultraviolet ray setting resin 32 is shaken off. As a result, the ultraviolet ray setting resin 32 is equally coated on the information signal portion 1c of the replica substrate 1a. Thus, a film having an equal thickness is formed. The film thickness of the ultraviolet ray setting resin 32 that has been shaken off can be adjusted with the rotation speed.

Next, as shown in FIG. 12, the replica substrate 1a on which the ultraviolet ray setting resin 32 has been coated is placed in a radiation range of an ultraviolet ray light source 34 that can emit an ultraviolet ray. At that point, the replica substrate 1a is placed so that the coated side of the ultraviolet ray setting resin 32 faces the ultraviolet ray light source 34. Thereafter, an ultraviolet ray is radiated from the ultraviolet ray light source 34 to the ultraviolet ray setting resin 32 on the upper main plane of the replica substrate 1a. At that point, the cumulative intensity of the ultraviolet ray is for example 500 mJ/cm$^2$. With the radiation of the ultraviolet ray, the ultraviolet ray setting resin 32, which coats the information signal portion 1c on the replica substrate 1a, is hardened. As a result, the reaction protection resin layer 31 has been formed. Thus, the disc substrate 1 according to the third embodiment has been produced.

The inventors of the present invention have formed the reaction protection resin layers 31 on the disc substrates 1 produced by the forgoing producing method in various production conditions. A disc substrate on which the reaction protection resin layer 31 has been formed is referred to as disc substrate of each of examples.

First of all, as the ultraviolet ray setting resin 32 to be coated, with a resin that does not contain a solvent and whose viscosity is $4.0 \times 10^{-2}$ Pa·s (40 cps), the reaction protection resin layer 31 has been formed on the replica substrate 1a. As a result, the disc substrate 1 has been produced. At that point, the non-solvent type resin has been supplied at a radial position of 17 mm of the replica substrate 1a. The disc substrate 1 has been rotated at 83.3 s$^{-1}$ (5000 rpm) about the rotating shaft. A disc substrate produced in a rotation time of 1 sec is referred to as disc substrate 1 of Example 11. A disc substrate produced in a rotation time of 2 sec is referred to as disc substrate 1 of Example 12. A disc substrate produced in a rotation time of 4 sec is referred to as disc substrate 1 of Example 13. A disc substrate produced in a rotation time of 7 sec is referred to as disc substrate 1 of Example 14. A disc substrate produced in a rotation time of 10 sec is referred to as disc substrate 1 of Example 15. A disc substrate produced in a rotation time of 20 sec is referred to as disc substrate 1 of Example 16.

In addition, as the ultraviolet ray setting resin 32 to be coated, with a solvent type resin that contains 50 weight % of methoxy propanol and that has a viscosity of $1.0 \times 10^{-1}$ Pa·s (10 cps), the reaction protection resin layer 31 has been formed on the replica substrate 1a. They have been left for 30 seconds. After the solve had been fully given off, they have been hardened by the radiation of an ultraviolet ray. As a result, the disc substrate 1 has been produced. The solvent type resin has been supplied at a radius position of 17 mm of the replica substrate 1a. The disc substrate 1 has been rotated about the center of the rotating shaft in a rotation time of 83.3 s$^{-1}$ (5000 rpm). A disc substrate produced in a rotation time of 1 sec is referred to as disc substrate 1 of Example 17. A disc substrate produced in a rotation time of 2 sec is referred to as disc substrate 1 of Example 18. A disc substrate produced in a rotation time of 4 sec is referred to as disc substrate 1 of Example 19. A disc substrate produced in a rotation time of 7 sec is referred to as disc substrate 1 of Example 20. A disc substrate produced in a rotation time of 10 sec is referred to as disc substrate 1 of Example 21. A disc substrate produced in a rotation time of 20 sec is referred to as a disc substrate 1 of Example 22.

Table 3 shows film thickness characteristics of the reaction protection resin layer 31 of the disc substrates 1 of Example 11 to Example 16 produced with the aforementioned non-solvent type ultraviolet ray setting resin 32 (namely, the average film thickness of the reaction protection resin layer 31 in the data region of the disc substrates 1, the film thickness of the reaction protection resin layer 31 in the inner circumference of the data region (radius: 24 mm), the film thickness of the reaction protection resin layer 31 in the outer circumference of the data region (radius: 58 mm), and the difference between the inner and outer circumferential film thicknesses. Table 4 shows the results of the film thickness characteristics of the reaction protection resin layer 31 of the disc substrates 1 of Example 17 to Example 22 produced with the ultraviolet ray setting resin 32, which contains a solvent.

TABLE 3

|  | Example 11 | Example 12 | Example 13 | Example 14 | Example 15 | Example 16 |
| --- | --- | --- | --- | --- | --- | --- |
| Rotation time[s] | 1 | 2 | 4 | 7 | 10 | 20 |
| Average film thickness [μm] | 7.6 | 5.8 | 4.3 | 3.0 | 2.7 | 1.9 |
| Difference between inner and outer | 2.3 | 1.8 | 1.3 | 1.0 | 0.8 | 0.6 |

TABLE 3-continued

|  | Example 11 | Example 12 | Example 13 | Example 14 | Example 15 | Example 16 |
|---|---|---|---|---|---|---|
| circumferential film thickness [μm] | | | | | | |

TABLE 4

|  | Example 17 | Example 18 | Example 19 | Example 20 | Example 21 | Example 22 |
|---|---|---|---|---|---|---|
| Rotation time[s] | 1 | 2 | 4 | 7 | 10 | 20 |
| Average film thickness [μm] | 2.9 | 2.2 | 2.0 | 1.8 | 1.7 | 1.6 |
| Difference between inner and outer circumferential film thickness [μm] | 0.4 | 0.3 | 0.2 | 0.2 | 0.1 | 0.1 |

Table 3 shows that when the reaction protection resin layer 31 is formed with the non-solvent type ultraviolet ray setting resin 32 by the spin coat method, as the rotation time is increased, the average film thickness and the difference between the inner and outer circumferential film thicknesses are decreased. Table 4 shows that when the reaction protection resin layer 31 is formed with the ultraviolet ray setting resin 32 that contains a solvent by the spin coat method, as the rotation time is increased, the average film thickness is decreased and the difference between inner and outer circumferential film thicknesses becomes very large in comparison with those of the disc substrates 1 of Example 11 to Example 16. When the ultraviolet ray setting resin is formed by the spin coat method, the film thickness of the inner circumferential portion tends to be larger than the film thickness of the outer circumferential portion. Thus, it is preferred to use a resin that contains a solvent as the ultraviolet ray setting resin 32. With the ultraviolet ray setting resin that contains the solvent, it is clear that the difference between the inner and outer circumferential portions of the data area becomes 1 μm or smaller.

As described above, after the reaction protection resin layer 31 has been formed, the disc substrate 1 on which the reaction protection resin layer 31 has been formed and the sheet 4 of the first embodiment are adhered by the adhering device of the first embodiment. As a result, the optical disc according to the third embodiment has been produced.

The inventors of the present invention have measured the initial reflectance and the reflectance after the acceleration tests for the optical discs of which the sheet 4 has been adhered to the front surface of the reaction protection resin layer 31 of the disc substrates 1 of Example 11 to Example 22 (these optical discs are referred to as optical discs of Example 11 to Example 22) in the same manner as the first embodiment and calculated the rates of variation of reflectance thereof. An optical disc of Comparative Example is the same as that of the first embodiment.

TABLE 5

|  | Comparative example | Example 11 | Example 12 | Example 13 | Example 14 | Example 15 | Example 16 |
|---|---|---|---|---|---|---|---|
| Film thickness of reaction protection resin layer [μm] | 0 | 7.6 | 5.8 | 4.3 | 3.0 | 2.7 | 1.9 |
| Initial reflectance [%] | 20.0 | 18.8 | 18.9 | 19.1 | 19.3 | 19.5 | 19.5 |
| Reflectance after acceleration test [%] | 14.3 | 18.5 | 18.5 | 18.6 | 18.7 | 18.9 | 18.8 |
| Amount of variation of reflectance [%] | 5.7 | 0.3 | 0.4 | 0.5 | 0.5 | 0.6 | 0.7 |
| Amount of variation of reflefctance/ Initail reflectance | 0.285 | 0.016 | 0.021 | 0.026 | 0.026 | 0.031 | 0.036 |

TABLE 6

|  | Comparative example | Example 17 | Example 18 | Example 19 | Example 20 | Example 21 | Example 22 |
|---|---|---|---|---|---|---|---|
| Film thickness of reaction protection resin layer [μm] | 0 | 2.9 | 2.2 | 2.0 | 1.8 | 1.7 | 1.6 |
| Initial reflectance [%] | 20.0 | 19.3 | 19.3 | 19.4 | 19.5 | 19.5 | 19.6 |
| Reflectance after | 14.3 | 18.8 | 18.8 | 18.8 | 18.9 | 18.8 | 18.8 |

TABLE 6-continued

|  | Comparative example | Example 17 | Example 18 | Example 19 | Example 20 | Example 21 | Example 22 |
| --- | --- | --- | --- | --- | --- | --- | --- |
| acceleration test [%] Amount of variation of reflectance [%] | 5.7 | 0.5 | 0.5 | 0.6 | 0.6 | 0.7 | 0.8 |
| Amount of variation of reflectance/ Initail reflectance | 0.285 | 0.026 | 0.026 | 0.031 | 0.031 | 0.036 | 0.041 |

Table 5 shows that the rate of variation of reflectance of the optical disc of Comparative Example is 0.285 and that when at least the reaction protection resin layers 31 have been formed on the optical discs of Example 11 to Example 16, the rates of variation of reflectance thereof can be decreased. In the optical disc of Comparative Example, yellowish discoloring has been observed. In the optical discs of Example 11 to Example 16, discoloring of the adhesive layer 2b has been hardly observed. The adhesive layer 2b has been transparent.

When the rate of variation of reflectance exceeds 0.1, the recording/reproducing characteristics of an information signal deteriorate. It is clear that the rate of variation of reflectance of the optical disc of Example 16 is 0.036, which is very small, although the film thickness of the reaction protection resin layer 31 of Example 16 is 1.9 μm, which is the smallest in the optical discs of Example 11 to Example 16. Thus, it is clear that when the reaction protection resin layer 31 is formed, it is certain that the rate of variation of reflectance becomes 0.1 or smaller and thereby good recording/reproducing characteristics can be obtained.

Table 6 shows that the rate of variation of reflectance of the optical disc of Comparative Example is 0.285 and that when at least reaction protection resin layer 31 has been formed, the rate of variation of reflectance of the optical discs of Example 17 to Example 22 can be decreased. In the optical disc of Comparative Example, yellowish discoloring has been observed. However, in the optical discs of Example 17 to Example 22, discoloring of the adhesive layer 2b of the optical discs has been hardly observed. The adhesive layer 2b has been transparent.

It is clear that the rate of variation of reflectance of the optical disc of Example 22 is 0.041, which is very small, although the film thickness of the reaction protection resin layer 31 of Example 22 is 1.6 μm, which is the smallest in the optical discs of Example 17 to Example 22. Thus, it is clear that when the reaction protection resin layer 31 is formed, it is certain that the rate of variation of reflectance becomes 0.1 or smaller and thereby good recording/reproducing characteristics can be obtained.

In the optical disc according to the third embodiment of the present invention, since the ultraviolet ray setting resin is coated and hardened on the replica substrate 1a so that the ultraviolet ray setting resin fully coats the information signal portion 1c. As a result, the reaction protection resin layer 31 is formed. The light transmission layer 2 is formed through the reaction protection resin layer 31. As a result, the same effect as the first embodiment can be obtained.

When the optical disc according to the third embodiment is produced, the ultraviolet ray setting resin 32 that contains a solvent is coated on the reaction protection resin layer 31 by the spin coat method. Thus, the light transmission layer of which the difference between the inner and outer circumferential film thicknesses of the data region is small can be formed. Consequently, an optical disc having good recording/reproducing characteristics can be produced.

So far, embodiments of the present invention have been practically described. However, the present invention is not limited to those. Instead, there are various modifications of the present invention without departing from the spirit thereof.

For example, numerical values, materials, structures of optical discs that have been described in the forgoing embodiments are just examples. When necessary, different numerical values, materials, and structures of optical discs may be used.

In the forgoing embodiments, the present invention is applied to optical discs having a light transmission layer. In addition, the present invention can be applied to optical hard disks and removable optical hard disks that use magneto-optical recording and reproducing. According to the forgoing first embodiment, the present invention is applied to a phase change type optical disc, where an information signal is recorded using a phase change. However, the present invention can be applied to other rewritable optical disc, a write once type optical disc, or a read only type optical disc without departing from the spirit of the present invention.

When two optical discs of an embodiment of the present invention are adhered so that their light transmission layers 2 face outside, a double-sided optical disc can be produced.

In addition, according to the first embodiment, an example of which an information signal portion is formed on a substrate has been described. Alternatively, the information signal portion may be formed on a sheet so that the information signal portion faces the substrate. The sheet may be made of a plurality of thin films. The outermost layer may be unevenly formed as the information signal portion.

As described above, according to the present invention, since a reaction protection layer is formed on an adhesive layer side of the information signal portion, the information signal portion on one main plane of the substrate can be prevented from chemically reacting with the adhesive layer of the light transmission layer. Thus, in the optical disc of which the light transmissivity sheet has been adhered to one main surface of the substrate through the adhesive layer, the variation of reflectance of each optical disc can be suppressed. In addition, the variation of reflectance of the recording/reproducing plane of the optical disc can be suppressed. Moreover, the optical disc can conform with a large NA of an objective lens used to record/reproduce data. The optical disc has a light transmission layer that has small double refraction, high transparency, and equal film thickness. In addition, the production yield of the optical disc can be improved.

What is claimed is:

1. An optical disc comprising:
    a substrate;
    an information signal portion having a plurality of layers and configured to record and/or reproduce an information signal; and a light transmission layer configured to transmit laser light used to record and/or reproduce the information signal, the information signal portion and the light transmission layer being formed on one main plane of the substrate of the optical disc, wherein the light transmission layer comprises a sheet having light transmissivity and an adhesive layer made of a pressure-sensitive adhering agent for adhering the sheet to the main plane of the substrate, wherein the light transmission layer has a film thickness in the range from 90 µm to 110 µm, and wherein a reaction protection layer having a dielectric of one of silicon nitride and silicon oxide is formed on the information signal portion so that the reaction protection layer faces the adhesive layer.

2. The optical disc as set forth in claim 1, wherein the reaction protection layer has a thickness in the range from 2 nm to 30 nm.

3. The optical disc as set forth in claim 1, wherein the information signal portion has a film thickness in the range from 183 nm to 313 nm.

4. An optical disc comprising:
a substrate;
an information signal portion having a plurality of layers and configured to record and/or reproduce an information signal; and
a light transmission layer configured to transmit laser light used to record and/or reproduce the information signal, the information signal portion and the light transmission layer being formed on one main plane of the substrate of the optical disc, wherein the light transmission layer comprises at least a sheet having light transmissivity and an adhesive layer configured to adhere the sheet to the main plane of the substrate, wherein the light transmission layer has a film thickness in the range from 90 µm to 110 µm, and wherein a reaction protection layer having an ultraviolet ray setting resin is formed between the information signal portion and the adhesive layer.

5. The optical disc as set forth in claim 4, wherein a distribution of the film thickness of the reaction protection layer in a region of at least the information signal portion is 1 µm or smaller.

6. The optical disc as set forth in claim 4, wherein the information signal portion has a film thickness in the range from 183 nm to 313 nm.

7. The optical disc as set forth in claim 4, wherein the reaction protection layer is formed by coating ultraviolet ray setting resin that contains a solvent on the information signal portion by a spin coat method, such that the solvent that is contained in the ultraviolet ray setting resin is substantially removed, and by hardening the ultraviolet ray setting resin.

8. The optical disc as set forth in claim 7, wherein the solvent is methoxypropanol.

9. An optical disc, comprising:
a substrate;
an information signal portion configured to record and/or reproduce an information signal; and
a light transmission layer configured to transmit laser light used to record and/or reproduce the information signal, the information signal portion and the light transmission layer being formed on one main plane of the substrate, wherein the light transmission layer comprises a sheet having light transmissivity and an adhesive layer configured to adhere the sheet to the main plane of the substrate, wherein the information signal portion comprises a reflection layer configured to reflect the laser light, a first dielectric layer, a recording layer configured to record the information signal, and a second dielectric layer successively formed from the substrate, and wherein the second dielectric layer is made of a mixture of zinc sulfide and silicon oxide, and has a film thickness in one of the ranges from 45 nm to 90 nm and from 130 nm to 175 nm, so that the reflectance of the laser light on a flat plane of the substrate is 15% or larger.

10. An optical disc producing method, comprising:
forming an information signal portion configured to record and/or reproduce an information signal on a main plane of a substrate; and
forming a light transmissivity layer over the information signal portion, the light transmissivity sheet being configured to transmit light used to record and/or reproduce the information signal in a region that covers the information signal portion through an adhesive layer, wherein the adhesive layer is made of a pressure-sensitive adhering agent, wherein the light transmission layer has a film thickness in the range from 90 µm to 110 µm, and wherein a reaction protection layer having a dielectric of one of silicon oxide and silicon nitride is formed as an outermost layer of the information signal portion.

11. The optical disc producing method as set forth in claim 10, wherein the reaction protection layer has a film thickness in the range from 2 nm to 30 nm.

12. The optical disc producing method as set forth in claim 10, wherein the information signal portion has a film thickness in the range from 183 nm to 313 nm.

13. An optical disc producing method, comprising the steps of:
forming an information signal portion configured to record and/or reproduce an information signal on a main plane of a substrate;
forming a reaction protection layer made of an ultraviolet ray setting resin on an upper layer of the information signal portion; and
forming a light transmissivity sheet configured to transmit laser light used to record and/or reproduce the information signal in a region that covers the information signal portion through an adhesive layer, wherein the light transmission layer has a film thickness in the range from 90 µm to 110 µm.

14. The optical disc producing method as set forth in claim 13, wherein a distribution of the film thickness of the reaction protection layer in a region of at least the information signal portion is 1 µm or smaller.

15. The optical disc producing method as set forth in claim 13, wherein the information signal portion has a film thickness in the range from 183 nm to 313 nm.

16. The optical disc producing method as set forth in claim 13, wherein the reaction protection layer is formed by coating ultraviolet ray setting resin that contains a solvent on the information signal portion by a spin coat method, so that the solvent that is contained in the ultraviolet ray setting resin is substantially removed, and by hardening the ultraviolet ray setting resin.

17. The optical disc producing method as set forth in claim 16, wherein the solvent is methoxypropanol.

* * * * *